(12) United States Patent
Cesarano et al.

(10) Patent No.: US 12,549,944 B2
(45) Date of Patent: Feb. 10, 2026

(54) ELEVATED DEVICE AUTHENTICATION THROUGH MUTUAL IDENTIFICATION

(71) Applicant: International Business Machines Corporation, Armonk, NY (US)

(72) Inventors: David M. Cesarano, Queen Creek, AZ (US); Su Liu, Austin, TX (US); Logan Bailey, Atlanta, GA (US); Mir Farhan Ali, The Colony, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 18/439,860

(22) Filed: Feb. 13, 2024

(65) Prior Publication Data
US 2025/0260980 A1 Aug. 14, 2025

(51) Int. Cl.
*H04W 12/062* (2021.01)
*H04W 12/71* (2021.01)

(52) U.S. Cl.
CPC ......... *H04W 12/062* (2021.01); *H04W 12/71* (2021.01)

(58) Field of Classification Search
CPC ............................ H04W 12/062; H04W 12/71
See application file for complete search history.

(56) References Cited

U.S. PATENT DOCUMENTS

| | | | |
|---|---|---|---|
| 8,224,354 B2 | 7/2012 | De Vries | |
| 9,438,440 B2 | 9/2016 | Burns | |
| 10,262,334 B2 | 4/2019 | Heeter | |
| 11,405,789 B1* | 8/2022 | Wei | H04W 4/50 |
| 11,431,561 B2 | 8/2022 | Smith | |
| 11,449,857 B2 | 9/2022 | Han | |
| 2011/0010543 A1* | 1/2011 | Schmidt | H04W 12/06 713/168 |
| 2021/0334925 A1* | 10/2021 | Peacock | H04W 12/009 |
| 2022/0050982 A1 | 2/2022 | Spivack | |
| 2022/0159461 A1* | 5/2022 | Maass | H04L 9/0894 |
| 2023/0216947 A1 | 7/2023 | Bernardi | |

FOREIGN PATENT DOCUMENTS

| | | |
|---|---|---|
| CA | 2936586 A1 | 8/2015 |
| CA | 3060697 A1 | 4/2021 |

OTHER PUBLICATIONS

"Research & Product Testing", Mount Washington Observatory, © 2023, 4 pages, <https://web.archive.org/web/20230304212327/https://mountwashington.org/research-and-product-testing/>.

(Continued)

*Primary Examiner* — Quazi Farooqui
(74) *Attorney, Agent, or Firm* — Tihon Poltavets

(57) ABSTRACT

A computer-implemented method, a computer system and a computer program product authenticate devices using remote mutual identification. The method comprises determining that a network device requires management, where the network device is deployed in a location. The method also comprises identifying a trusted device, where the trusted device is within a range of the location of the network device. The method further comprises establishing a trust relationship between the trusted device and the network device. Lastly, the method comprises enabling management access to the network device based on the trust relationship.

18 Claims, 2 Drawing Sheets

(56) References Cited

OTHER PUBLICATIONS

Adil, M. et al., "An Intelligent HybridMutual Authentication Scheme for Industrial Internet of Thing Networks", Accepted: Nov. 30, 2020, DOI:10.32604/cmc.2021.014967, 24 pages.

Das, S. et al., "Lightweight and efficient privacy-preserving mutual authentication scheme to secure Internet of Things-based smart healthcare", Accepted: Nov. 30, 2022, DOI: 10.1002/ett.4716, 16 pages.

Disclosed Anonymously "The Network of Interaction between Intelligent Devices basing on Context Awareness in Internet of Things", An IP.com Prior Art Database Technical Disclosure, IP.com No. IPCOM000251809D, IP.com Electronic Publication Date: Dec. 5, 2017, 6 pages.

Disclosed Anonymously, "Proximity based authentication method for internal WiFi networks", An IP.com Prior Art Database Technical Disclosure, IP.com No. IPCOM000265162D, IP.com Electronic Publication Date: Mar. 5, 2021, 5 pages.

Khan, S. et al., "Efficient Mutual Authentication mechanism to Secure Internet of Things (IoT)", Downloaded on Sep. 10, 2023, 4 pages.

Kushwaha et al., "Internet of Things Secured Onboarding Mechanism", An IP.com Prior Art Database Technical Disclosure, IP.com No. IPCOM000252429D, IP.com Electronic Publication Date: Jan. 10, 2018, 6 pages.

Wang, H. et al., "Lightweight and Anonymous Mutual Authentication Protocol for Edge IoT Nodes with Physical Unclonable Function", Published Jan. 4, 2022, 11 pages, <https://doi.org/10.1155/2022/1203691>.

International Searching Authority, "Notification of Transmittal of the International Search Report and the Written Opinion of the International Searching Authority, or Declaration," Patent Cooperation Treaty, Mar. 32, 2025, 13 pages, International Application No.—PCT/ EP2025/052221.

\* cited by examiner

ELEVATED DEVICE AUTHENTICATION THROUGH MUTUAL IDENTIFICATION

BACKGROUND

Embodiments relate generally to the field of communication systems and, more specifically, to elevated device authentication using mutual identification.

The technology ecosystem to which devices may connect and the Internet that may provide services to those devices and users facilitates the connection of clients, such as personal computers, tablets, smart phones, servers, digital photo-frames, and many other types of devices, to data centers that are hosted in server farms and are publicly accessible. However, this model may only represent a small portion of actual network usage of the globally connected network, and a very large number of connected resources may currently exist that are not publicly accessible, including but not limited to use cases such as corporate networks, private organizational control networks, and monitoring networks that often use peer-to-peer relays for anonymity.

The Internet of Things (IoT) continues to grow rapidly and may provide opportunities for monitoring, tracking, or controlling other devices and items, such as further IoT devices, other home and industrial devices, items in manufacturing and food production chains, and the like. As such, IoT devices may be deployed in remote or physically inaccessible locations and management of security hardened IoT devices in remote locations may be difficult. The many hurdles, such as limited or no on-site personnel, that must be overcome to achieve efficient and secure management may make it critical to independently identify IoT resources prior to logging into highly secure network resources.

SUMMARY

An embodiment is directed to a computer-implemented method for authenticating devices using remote mutual identification. The method may include determining that a network device requires management, where the network device is deployed in a location. The method may also include identifying a trusted device, where the trusted device is within a range of the location of the network device. The method may further include establishing a trust relationship between the trusted device and the network device. Lastly, the method may include enabling management access to the network device based on the trust relationship.

In another embodiment, the method may include notifying network management that the management access to the network device is enabled.

In a further embodiment, the method may include obtaining profile information about the network device and the location, and the identifying the trusted device may use a machine learning model that selects the trusted device from the profile information.

In yet another embodiment, the method may include displaying an identified trusted device to network management, monitoring interactions of the network management with the identified trusted device, and updating the trusted device based on the interactions of the network management with the identified trusted device.

In still another embodiment, the method may include capturing an image of the network device using a camera associated with the trusted device, wherein the network device displays a unique visual identifier, authenticating the unique visual identifier based on the image of the network device, and establishing the trust relationship between the trusted device and the network device based on an authenticated visual identifier.

In another embodiment, the method may include capturing a unique audio signal using a microphone associated with the trusted device, wherein the network device transmits the unique audio signal, authenticating the unique audio signal from the network device, and establishing the trust relationship between the trusted device and the network device based on an authenticated audio signal.

In a further embodiment, the method may include determining the location of the network device using one or more of: a wireless network service set identifier (SSID), Bluetooth device identifier, and radio frequency identifier (RFID) tag.

In addition to a computer-implemented method, additional embodiments are directed to a computer system and a computer program product for authenticating devices using remote mutual identification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
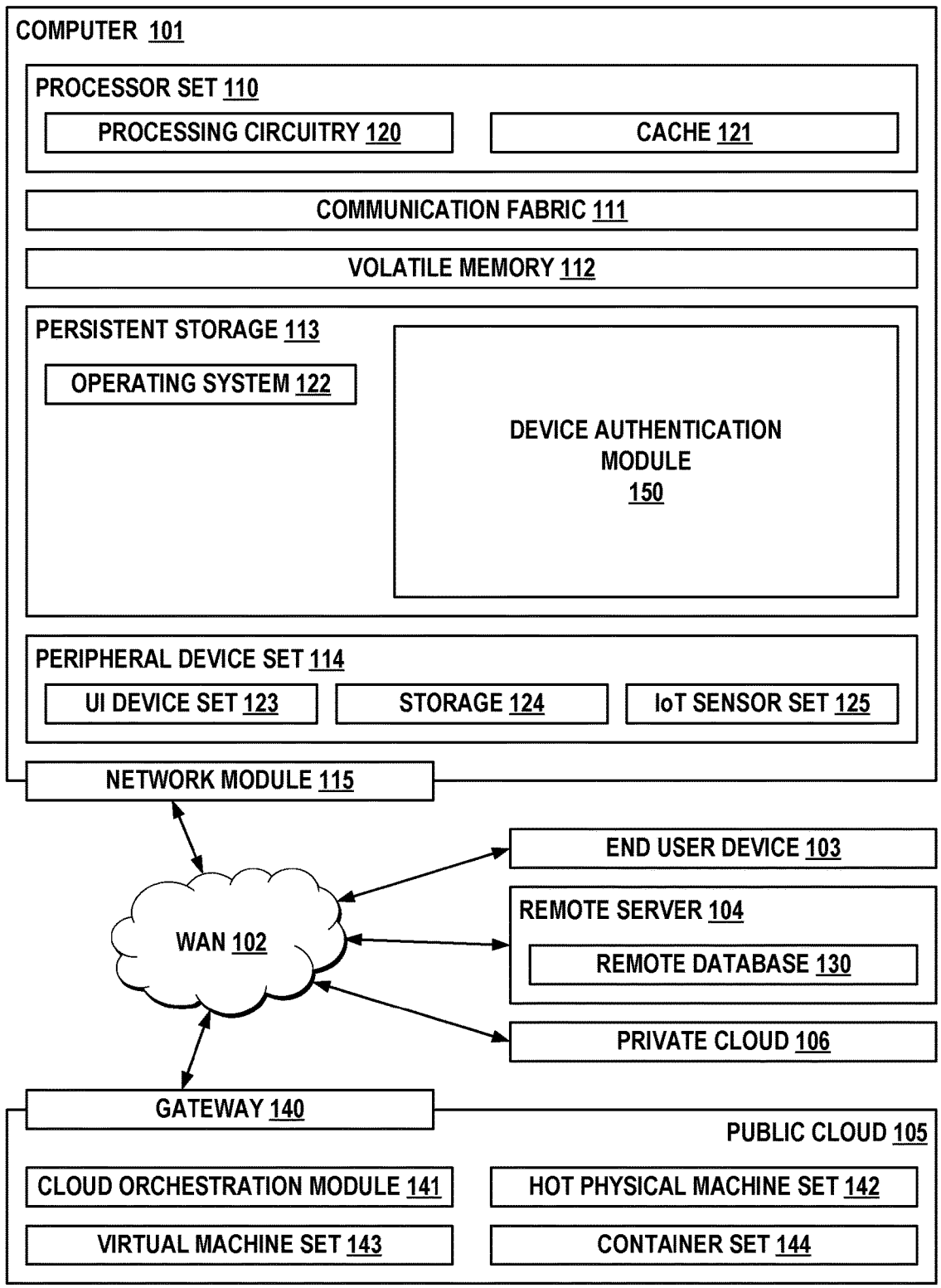
FIG. 1 depicts a block diagram of an example computer system in which various embodiments may be implemented.

In today's Internet ecosystem, it is widely believed that the Internet is mainly composed of connection of clients, such as personal computers, tablets, smart phones, servers, digital photo-frames, and many other types of devices, to publicly accessible data centers hosted in server farms. However, this may represent only a small portion of the overall usage of the globally connected network as a very large number of connected resources currently exist that are not publicly accessible. Examples include corporate networks, private organizational control networks, and monitoring networks spanning the globe, often using peer-to-peer relays for anonymity. For organizations, Internet of Things (IoT) devices may provide opportunities for monitoring, tracking, or controlling other devices and items, including further IoT devices, other home and industrial devices, items in manufacturing and food production chains, and the like. In addition, many IoT devices may be deployed in remote locations that may be difficult to access.

In such a scenario, management of security hardened devices may be an especially difficult task. There may be several hurdles, such as limited or no on-site personnel in rural regions or poor environmental conditions such as loud noises, poor visibility or out of reach devices, that must be overcome to reduce the complexity of configuration or upgrades of remote devices, a process that may require an open two-way connection to the device. At the same time, security may be a top priority for device owners, e.g., government agencies and private companies, because of an increase in the prevalence of hacking and takeover for online devices. This may require more stringent security controls such as locking the device down by not allowing ingress traffic, i.e., only allowing outgoing traffic, which increase the level of device security but also increase the complexity to managing the device.

It may therefore be useful to provide a method or system to authenticate devices using remote mutual identification. Such a method or system may use other devices to successfully manage devices, thereby reducing the complexity of the task while also maintaining an increased security posture. Mobile devices that are proximate to a subject device and provide data such as location, video and audio may be identified based on the location of the subject device and a remote mutual identification process may be initiated between an identified device and a subject device for the purposed of authentication through assertion based on the location, video and audio. Real-Time Location Systems (RTLS) protocols may be utilized in conjunction with a mobile device acting as gateway or key to unlock and establish a trusted relationship between the subject device and the mobile device. The method or system may enable integration and access to a source device for gaining limited time-based escalated access to the target device. Remote mutual identification may be based on visual (primary) and audio identification that can only occur when in proximity of a target device. As an example, a remotely operated device may be used to access devices that may be high or out of reach in locations such as mountainous regions or on the roof of a building. Such a method or system may increase efficiency of networks, including IoT networks, by allowing the configuration and management of security hardened network devices in remote or difficult locations.

Referring to FIG. 1, computing environment 100 contains an example of an environment for the execution of at least some of the computer code involved in performing the inventive methods, such as device authentication module 150. In addition to device authentication module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and device authentication module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in device authentication module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in device authentication module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to authenticate devices using remote mutual identification. In particular, device authentication module 150 may determine that a network device, e.g., a network IoT device, requires management and also the location of the network device. As mentioned above, management as used herein may take many forms, including configuration or upgrades of an IoT device, e.g., making changes to the device to accommodate updates to one or more connections of the device or upgrading software running on the IoT device. It is not required for the device authentication module 150 to have knowledge of the specific management task, only that management is required on the subject network device. The requirement for management may be determined by either the network device itself or by the network through an automated program or a human network administrator. In addition, the determination may be made independent of the device, such as with a schedule or other mechanism within the device or network or may be requested by either the network or the device. The location of the device may be obtained directly from the device or using configured profile data about the device that may be available. The location of the device may take the form of exact coordinates, such as latitude and longitude, or any other appropriate measure, including current or past GPS data related to the device.

The location of the device requiring management may then be used by the device authentication module 150 to identify trusted devices within a range of the network device. Trusted devices may be those devices that are preconfigured or registered to be used as a trusted device or a machine learning model may be trained to predict whether a device that is within range of the network device may be used as a trusted device, either because of the owner of the device or because of a capability. A trust relationship may be established by the device authentication module 150 between the trusted device and the network device using audio, visual or other data means in a remote mutual identification process that may confirm the authenticity of both parties. Once the trust relationship is established, management access may be enabled to the network device and login to either the network or the device itself may proceed as normal and the automated network process or human technician may complete the tasks for which management of the network device may be required.

Figure 2:
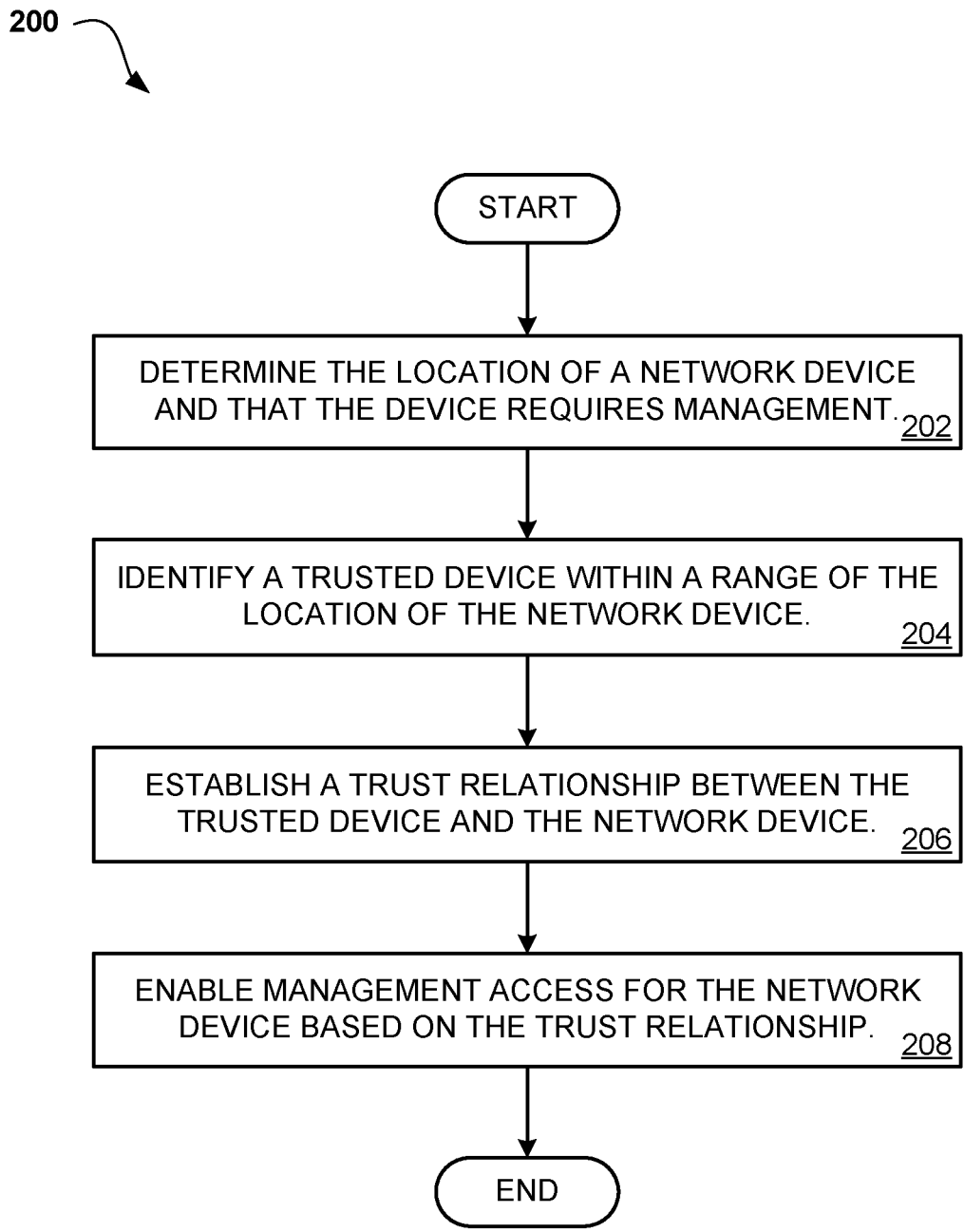
FIG. 2 depicts a flow chart diagram for a process to authenticate devices using remote mutual identification according to an embodiment.

Referring to FIG. 2, an operational flowchart illustrating a process 200 that authenticates devices using remote mutual identification is depicted according to at least one embodiment. At 202, the device authentication module 150 may determine that a network device requires management and also the location of the network device requiring management. As mentioned above, the need for management may be determined by either the network device itself or though the network using an automated program or a human network administrator. For example, new device firmware may be available for download and installation to the network device but, because of security settings or for other reasons such as physical challenges, e.g., a device may be installed in a difficult physical location or the lack of an available technician to perform the upgrade, a connection may not be available. The determination may be made independent of the device, such as with a schedule or other mechanism within the device or network or may be requested by either the network or the device. It should be noted that security information about the network device may be known to the device authentication module 150 but may also be obtained while determining that the network device requires management. For instance, while a network administrator may wish to update security settings or other configuration of the network device, it may also be determined that the device uses specific network protocols or authentication measures to maintain security that must be maintained.

At the same time, the location of the device may be obtained directly from the device or using configured profile data about the device that may be available. The location data may take the form of exact coordinates, such as latitude and longitude, or any other appropriate measure, including current or past GPS data related to the network device. In addition, to specific a specific geographic location or position within a building or network, the location data may also indicate the physical challenges described above, e.g., whether the device may be installed on a roof or in a mountainous region or some other location that may make physical access to the network device challenging to a technician.

At 204, a trusted device may be identified within a range of the network device using the obtained location. The device authentication module 150 may scan within a configured range of the network device or may simply look for devices that are nearby. The device authentication module 150 may have other network devices configured as trusted devices in a profile or other database or else devices may be found close in proximity to the network device and configured to act as a trusted device. This may include analyzing the features of a device for the capability to be a trusted device as described herein. In embodiments, such identification of devices and determination of location or proximity of a device to the network device may include the use of techniques such as radio frequency ID (RFID) with appropriate tags or other wireless networking standards such as Bluetooth identification or WiFi service set identifier (SSID). It may also be determined that devices are in motion and may move to a position such that a device becomes a better choice of trusted device for remote mutual identification with the network device.

In an embodiment, a supervised machine learning model may be trained to predict the trusted device based on proximity and features of the device. One or more of the following machine learning algorithms may be used: logistic regression, naive Bayes, support vector machines, deep neural networks, random forest, decision tree, gradient-boosted tree, multilayer perceptron. One of ordinary skill in the art will recognize that this is a non-limiting list of algorithms that may be used at this step. In an embodiment, an ensemble machine learning technique may be employed that uses multiple machine learning algorithms together to assure better classification when compared with the classification of a single machine learning algorithm. In this embodiment, training data for the model may comprise past events requiring management of network devices that may include a single device or multiple devices. Past management events may be for the specific network device requiring current management or for network devices of the same type or in a similar location. The results may be stored in a database so that the data is most current, and the output would always be up to date.

The identification of a trusted device may also be displayed to network management, which may comprise an automated program or other software that may be used to manage a network and potential trusted devices or may alternatively comprise a network administrator or other user, either of which may confirm that a device is suitable as a trusted device. If the identification is not confirmed by the network management, e.g., the software described above or the network administrator or user, the device authentication module 150 may update the trusted device by removing the identified device and running the identification process again. This feedback mechanism may improve the accuracy of the machine learning model over time, where intervention at this stage of the process eventually may be obviated.

At 206, a trust relationship may be established between the trusted device and the network device requiring management. The device authentication module 150 may initiate a connection from the trusted device and authenticate the identity of the network device. While authentication may also take the form of an electronic transaction, the trust relationship in this step is intended to be a remote mutual identification process that may be accomplished using visual, audio or radio means. In an embodiment, the trusted device may move, if necessary, to a position where it may be possible for the trusted device to capture an image of the network device using a camera associated with the trusted device. The network device may display a unique visual identifier, e.g., a QR code or text message, which may be detected in the captured image and authenticated. In this embodiment, the unique visual identifier may be automatically displayed by the network device, or the trusted device may initiate a challenge to the network device to produce the unique visual identifier. The image may also be used to confirm the location of the network device as an added security check and the trust relationship may be established based on an authenticated visual identifier and a confirmed location of the network device. In another embodiment, a directional microphone may be used by the trusted device to detect a unique audio signal that may be transmitted by the network device. In this embodiment, the audio signal may be authenticated by the trusted device and the location of the network device may also be confirmed based on the audio signal. In this embodiment, the trust relationship may be established between the trusted device and the network device based on an authenticated audio signal and confirmed location of the network device. As with the visual embodiment, the unique audio signal may be automatically transmitted by the network device, or the trusted device may initiate a challenge to the network device to produce the unique audio signal. It should also be noted that the techniques mentioned above in selecting a trusted device may also be used in the establishment of a trusted relationship by confirming both identity and location of the network device. In addition, one of ordinary skill in the art would recognize that these techniques may also be used to wake up devices for the purposes of confirming locations or determining identity or suitability as a trusted device.

At 208, management access may be enabled for the network device based on an established trust relationship. Management access may be granted to the device so that management or enterprise login processes that may be in place may be allowed to continue, either enabled by the device based on a communication from the device authentication module 150 or else enabled directly by the device authentication module 150. Enabling management access may take the form of waking up the network device, if necessary, and enabling ingress network access, including enabling WiFi connections if available and also if any of these services have been disabled previously. Security measures that may be in place for the network device may also include a timing mechanism that may allow the automatic configuration of settings in the device to a trusted level or to a default setting that may allow access by a trusted user in the event of problems during any part of the process described herein. In addition, the trust relationship that may be established in the prior step may allow normal security protocols to be followed but is not intended to replace or supersede those protocols.

Once management has been enabled on the network device, network management, e.g., a network administrator or the network at large, may be notified that management access is enabled for the network device so that appropriate action may be taken to perform any necessary tasks. Such notification may take the form of an email or SMS text message to a designated contact or group of contacts or may be a broadcast to the entire network. It should also be noted that any communication that may be undertaken by the device authentication module 150 may encrypted using any known encryption scheme, e.g., public or private key (PKI), to protect the security of the remote mutual identification process.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for authenticating devices using remote mutual identification, the computer-implemented method comprising:
   determining that a network device requires management, wherein the network device is deployed in a location;
   obtaining profile information about the network device and the location;
   identifying a trusted device using a machine learning model to select the trusted device from the profile information, wherein the trusted device is within a range of the location of the network device;
   establishing a trust relationship between the trusted device and the network device; and
   enabling management access to the network device based on the trust relationship.

2. The computer-implemented method of claim 1, further comprising:
   notifying network management that the management access to the network device is enabled.

3. The computer-implemented method of claim 1, further comprising:
   displaying an identified trusted device to network management;
   monitoring the network management with the identified trusted device; and
   updating the trusted device based on the monitoring of the network management with the identified trusted device.

4. The computer-implemented method of claim 1, further comprising:
   capturing an image of the network device using a camera associated with the trusted device, wherein the network device displays a unique visual identifier;
   authenticating the unique visual identifier based on the image of the network device; and
   establishing the trust relationship between the trusted device and the network device based on an authenticated visual identifier.

5. The computer-implemented method of claim 1, further comprising:
   capturing a unique audio signal using a microphone associated with the trusted device, wherein the network device transmits the unique audio signal;
   authenticating the unique audio signal from the network device; and
   establishing the trust relationship between the trusted device and the network device based on an authenticated audio signal.

6. The computer-implemented method of claim 1, further comprising:
   determining the location of the network device using one or more of: a wireless network service set identifier (SSID), Bluetooth device identifier, and radio frequency identifier (RFID) tag.

7. A computer system for authenticating devices using remote mutual identification, the computer system comprising:
   a processor set;
   one or more computer readable storage media; and
   program instructions stored on the one or more computer readable storage media to cause the processor set to perform operations comprising:
      determining that a network device requires management, wherein the network device is deployed in a location;
      obtaining profile information about the network device and the location;
      identifying a trusted device using a machine learning model to select the trusted device from the profile information, wherein the trusted device is within a range of the location of the network device;
      establishing a trust relationship between the trusted device and the network device; and
      enabling management access to the network device based on the trust relationship.

8. The computer system of claim 7, wherein the operations further comprise:
   notifying network management that the management access to the network device is enabled.

9. The computer system of claim 7, wherein the operations further comprise:
   displaying an identified trusted device to network management;
   monitoring the network management with the identified trusted device; and
   updating the trusted device based on the monitoring of the network management with the identified trusted device.

10. The computer system of claim 7, wherein the operations further comprise:
    capturing an image of the network device using a camera associated with the trusted device, wherein the network device displays a unique visual identifier;
    authenticating the unique visual identifier based on the image of the network device; and
    establishing the trust relationship between the trusted device and the network device based on an authenticated visual identifier.

11. The computer system of claim 7, wherein the operations further comprise:
    capturing a unique audio signal using a microphone associated with the trusted device, wherein the network device transmits the unique audio signal;
    authenticating the unique audio signal from the network device; and
    establishing the trust relationship between the trusted device and the network device based on an authenticated audio signal.

12. The computer system of claim 7, wherein the operations further comprise:
    determining the location of the network device using one or more of: a wireless network service set identifier (SSID), Bluetooth device identifier, and radio frequency identifier (RFID) tag.

13. A computer program product for authenticating devices using remote mutual identification, the computer program product comprising:
    one or more computer readable storage media; and
    program instructions stored on the one or more computer readable storage media to perform operations comprising:
        determining that a network device requires management, wherein the network device is deployed in a location;
        obtaining profile information about the network device and the location;
        identifying a trusted device using a machine learning model to select the trusted device from the profile information, wherein the trusted device is within a range of the location of the network device;
        establishing a trust relationship between the trusted device and the network device; and
        enabling management access to the network device based on the trust relationship.

14. The computer program product of claim 13, wherein the operations further comprise;
    notifying network management that the management access to the network device is enabled.

15. The computer program product of claim 13, wherein the operations further comprise:
    displaying an identified trusted device to network management;
    monitoring of the network management with the identified trusted device; and
    updating the trusted device based on the monitoring of the network management with the identified trusted device.

16. The computer program product of claim 13, wherein the operations further comprise:
    capturing an image of the network device using a camera associated with the trusted device, wherein the network device displays a unique visual identifier;
    authenticating the unique visual identifier based on the image of the network device; and
    establishing the trust relationship between the trusted device and the network device based on an authenticated visual identifier.

17. The computer program product of claim 13, wherein the operations further comprise:
    capturing a unique audio signal using a microphone associated with the trusted device, wherein the network device transmits the unique audio signal;
    authenticating the unique audio signal from the network device; and
    establishing the trust relationship between the trusted device and the network device based on an authenticated audio signal.

18. The computer program product of claim 13, wherein the operations further comprise:
    determining the location of the network device using one or more of: a wireless network service set identifier (SSID), Bluetooth device identifier, and radio frequency identifier (RFID) tag.

* * * * *